US012595330B2

(12) United States Patent
Im et al.

(10) Patent No.: US 12,595,330 B2
(45) **Date of Patent: *Apr. 7, 2026**

(54) POLYOLEFIN-POLYSTYRENE-BASED MULTIBLOCK COPOLYMER AND METHOD FOR PREPARING THE SAME

(71) Applicant: LG Chem, Ltd., Seoul (KR)

(72) Inventors: Seul Ki Im, Daejeon (KR); Hyun Mo Lee, Daejeon (KR); Ji Hyun Park, Daejeon (KR); Yun Kon Kim, Daejeon (KR); Seung Jung Yu, Daejeon (KR); Seok Pil Sa, Daejeon (KR); Ki Soo Lee, Daejeon (KR); Eun Ji Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 981 days.

This patent is subject to a terminal disclaimer.

(21) Appl. No.: 17/781,463

(22) PCT Filed: Apr. 16, 2021

(86) PCT No.: PCT/KR2021/004823

§ 371 (c)(1),
(2) Date: Jun. 1, 2022

(87) PCT Pub. No.: WO2021/210953

PCT Pub. Date: Oct. 21, 2021

(65) Prior Publication Data

US 2023/0116142 A1 Apr. 13, 2023

(30) Foreign Application Priority Data

Apr. 16, 2020 (KR) ........................ 10-2020-0046031

(51) Int. Cl.
*C08F 297/02* (2006.01)

(52) U.S. Cl.
CPC ........ *C08F 297/02* (2013.01); *C08F 2410/01* (2013.01)

(58) Field of Classification Search
None
See application file for complete search history.

(56) References Cited

U.S. PATENT DOCUMENTS

2002/0137845 A1 9/2002 Boussie et al.
2002/0142912 A1 10/2002 Boussie et al.
(Continued)

FOREIGN PATENT DOCUMENTS

CN 103819636 A 5/2014
CN 106133016 A 11/2016
(Continued)

OTHER PUBLICATIONS

Park, K.L., et al., Preparation of Pyridylamido Hafnium Complexes for Coordinative Chain Transfer Polymerization, Polymers, May 2020, vol. 12, No. 5, Article No. 1100, pp. 1-18.
(Continued)

*Primary Examiner* — Fred M Teskin
(74) *Attorney, Agent, or Firm* — Lerner David LLP

(57) ABSTRACT

A polyolefin-polystyrene-based multiblock copolymer and method of making the same are disclosed herein. In some embodiments, a polyolefin-polystyrene-based multiblock copolymer satisfies conditions (a) a weight average molecular weight is 100,000 to 300,000 g/mol; (b) molecular weight distribution is 1.5 to 3.0; (c) measured results of gel permeation chromatography, a graph having an x-axis of log Mw and a y-axis of dw/dlog Mw, are fit to a Gaussian function, where all constants satisfy $-0.01<A<0.03$, $4.8<B<5.2$, $0.8<C<1.2$, and $0.6<D<1.2$; and (d) a polyolefin block comprises one or more branch points, where a carbon atom at the branch point is represented by a peak of 36 to 40

(Continued)

ppm, and a terminal carbon atom of a branched chain from the branch point is represented by a peak of 13 to 15 ppm.

5 Claims, 1 Drawing Sheet

(56) References Cited

U.S. PATENT DOCUMENTS

| | | | |
|---|---|---|---|
| 2002/0147288 | A1 | 10/2002 | Boussie et al. |
| 2002/0156279 | A1 | 10/2002 | Boussie et al. |
| 2002/0173419 | A1 | 11/2002 | Boussie et al. |
| 2002/0177711 | A1 | 11/2002 | LaPointe et al. |
| 2004/0122247 | A1 | 6/2004 | Boussie et al. |
| 2004/0209765 | A1 | 10/2004 | Boussie et al. |
| 2006/0135722 | A1 | 6/2006 | Boussie et al. |
| 2017/0037174 | A1 | 2/2017 | Arai et al. |
| 2018/0022852 | A1 | 1/2018 | Lee et al. |
| 2018/0258324 | A1 | 9/2018 | Tochihira et al. |
| 2019/0064051 | A1 | 2/2019 | Hong et al. |
| 2020/0031978 | A1 | 1/2020 | Lee et al. |
| 2021/0002303 | A1 | 1/2021 | Sa et al. |
| 2021/0002473 | A1 | 1/2021 | Lee et al. |
| 2021/0017377 | A1 | 1/2021 | Shin et al. |
| 2021/0108066 | A1 | 4/2021 | Hong et al. |
| 2022/0177634 | A1 | 6/2022 | Im et al. |
| 2023/0287207 | A1 * | 9/2023 | Park ...................... C08F 295/00 |

FOREIGN PATENT DOCUMENTS

| | | | |
|---|---|---|---|
| CN | 110475795 | A | 11/2019 |
| CN | 113631604 | A | 11/2021 |
| EP | 3590983 | A1 | 1/2020 |
| JP | 2008163140 | A | 7/2008 |
| JP | 2015199919 | A | 11/2015 |
| KR | 101657925 | B1 | 9/2016 |
| KR | 20170090479 | A | 8/2017 |
| KR | 101829382 | B1 | 2/2018 |
| KR | 101848781 | B1 | 4/2018 |
| KR | 20180058575 | A | 6/2018 |
| KR | 20190114715 | A | 10/2019 |
| KR | 20190114716 | A | 10/2019 |
| KR | 20200132634 | A | 11/2020 |
| WO | 0246249 | A2 | 6/2002 |
| WO | 2008112133 | A2 | 9/2008 |
| WO | 2018182174 | A1 | 10/2018 |
| WO | 2019190289 | A1 | 10/2019 |

OTHER PUBLICATIONS

Domski, G.J., et al., "Combined Experimental and Theoretical Approach for Living and Isoselective Propylene Polymerization", ACS Catalysis, Aug. 2017, vol. 7, No. 10. 9 pages.

Kim, C.S., et al., "Polystyrene Chain Growth from Di-End-Functional Polyolefins for Polystyrene-Polyolefin-Polystyrene Block Copolymers", Polymers, Oct. 2017, vol. 9, No. 10, Article No. 481, pp. 1-14.

International Search Report for PCT/KR2021/004823 dated Jul. 21, 2021. 5 pgs.

Extended European Search Report including Written Opinion for Application No. 21788648.0 dated Nov. 28, 2022, pp. 1-6.

* cited by examiner

POLYOLEFIN-POLYSTYRENE-BASED MULTIBLOCK COPOLYMER AND METHOD FOR PREPARING THE SAME

CROSS REFERENCE TO RELATED APPLICATIONS

The present application is a national phase entry under 35 U.S.C. § 371 of International Application No. PCT/KR2021/004823, filed on Apr. 16, 2021, which claims priority from Korean Patent Application No. 10-2020-0046031, filed on Apr. 16, 2020, the contents of which are incorporated by reference herein.

TECHNICAL FIELD

The present invention relates to a polyolefin-polystyrene-based multiblock copolymer having a structure in which polystyrene chains are attached to both terminals of a polyolefin chain, and a method for preparing the same.

BACKGROUND ART

Block copolymers are materials widely used in even high-tech devices as well as typical plastics, and research and development thereon is being actively conducted. Particularly, styrene-olefin copolymer resins including both a polyolefin-based (POs) block and a polystyrene-based (PSs) block have excellent properties of heat resistance, light resistance, elasticity, or the like, and are usefully used in wide variety of technical fields.

A market of a hundreds of thousands of tons scale is now formed in the world on polyolefin-polystyrene block copolymers, for example, styrene-ethylene-butylene-styrene (SEBS) or styrene-ethylene-propylene-styrene (SEPS). Typically, a polystyrene-block-poly(ethylene-co-1-butene)-block polystyrene (SEBS) triblock copolymer may be exemplified as one of the styrene-olefin copolymer resins. A hard polystyrene domain is separated from a soft poly(ethylene-co-1-butene) matrix in the structure of the SEBS triblock copolymer and acts as a physical crosslinking site, and thermoplastic elastomer properties are shown. According to such properties, SEBS is more broadly used in a product group requiring rubber and plastic, and according to the expansion of a using range, there is a significant increase in demand.

Meanwhile, the molecular weight and molecular weight distribution of a copolymer are important factors determining the mechanical properties, thermal properties, or the like of a material and influence processability a lot, and the analysis of a molecular weight for analyzing the physical properties of a copolymer is recognized as the most basic and important technique. As a method for measuring a molecular weight, there is a viscosity method, a terminal group analysis method, a light scattering method, or the like, and the most broadly used typical method is a method using gel permeation chromatography (GPC).

GPC is a method of separating a material by charging a porous gel in a column and by the difference of molecular weights, and used is a phenomenon by which a material having a large molecular weight is drained without passing through pores in the gel, and a retention time is short, while a material having a small molecular weight is drained after passing through pores in the gel, and a retention time is long. From this, a number average molecular weight, a weight average molecular weight, or the like may be computed.

Under such background, the inventors of the present invention studied for preparing a polyolefin-polystyrene-based multiblock copolymer showing desired physical properties of tensile strength, elongation, or the like, found that a polyolefin-polystyrene-based multiblock copolymer accomplishing the desired physical properties could be prepared by controlling the weight average molecular weight and molecular weight distribution of the copolymer in specific ranges, and completed the present invention.

PRIOR ART DOCUMENT

Patent Document

Korean Registration Patent No. 10-1657925

DISCLOSURE OF THE INVENTION

Technical Problem

An object of the present invention is to provide a polyolefin-polystyrene-based multiblock copolymer having a structure in which polystyrene chains are attached to both terminals of a polyolefin chain. Particularly, the present invention provides a polyolefin-polystyrene-based multiblock copolymer showing excellent mechanical properties such as tensile strength, elongation, and modulus by maintaining a specific relation between a weight average molecular weight and molecular weight distribution.

Technical Solution

In order to solve the above-described tasks, the present invention provides a polyolefin-polystyrene-based multiblock copolymer satisfying the following conditions of (a) to (c), measured from gel permeation chromatography (GPC), and the following conditions of (d) in $^{13}C$ NMR (500 MHz, tetrachloroethane-d2, standard material TMS) spectrum:

(a) a weight average molecular weight is from 100,000 to 300,000 g/mol;

(b) molecular weight distribution is from 1.5 to 3.0;

(c) with respect to measured results of the gel permeation chromatography, a Gaussian function modelled from a graph with an x-axis of log Mw and a y-axis of dw/dlog Mw is represented by the following Mathematical Formula 1, and in the following Mathematical Formula 1, all constants satisfy $-0.01<A<0.03$, $4.8<B<5.2$, $0.8<C<1.2$, and $0.6<D<1.2$; and (d) a polyolefin block in the polyolefin-polystyrene-based multiblock copolymer comprises one or more branch points, a carbon atom at the branch point shows a peak of 36 to 40 ppm, and a terminal carbon atom of a branched chain from the branch point shows a peak of 13 to 15 ppm:

[Mathematical Formula 1]

$$\frac{dw}{d\log Mw} = A + \frac{C\exp\left(\frac{-4\ln(2)(\log Mw - B)^2}{D^2}\right)}{D\sqrt{\frac{\pi}{4\ln(2)}}}$$

In Mathematical Formula 1, Mw is a molecular weight corresponding to a weight fraction (w) of the polyolefin-polystyrene-based multiblock copolymer.

Advantageous Effects

The polyolefin-polystyrene-based multiblock copolymer provided in the present invention has excellent mechanical properties of tensile strength, elongation, modulus, or the like, and may be usefully utilized in various industrial uses.

MODE FOR CARRYING OUT THE INVENTION

Figure 1A:
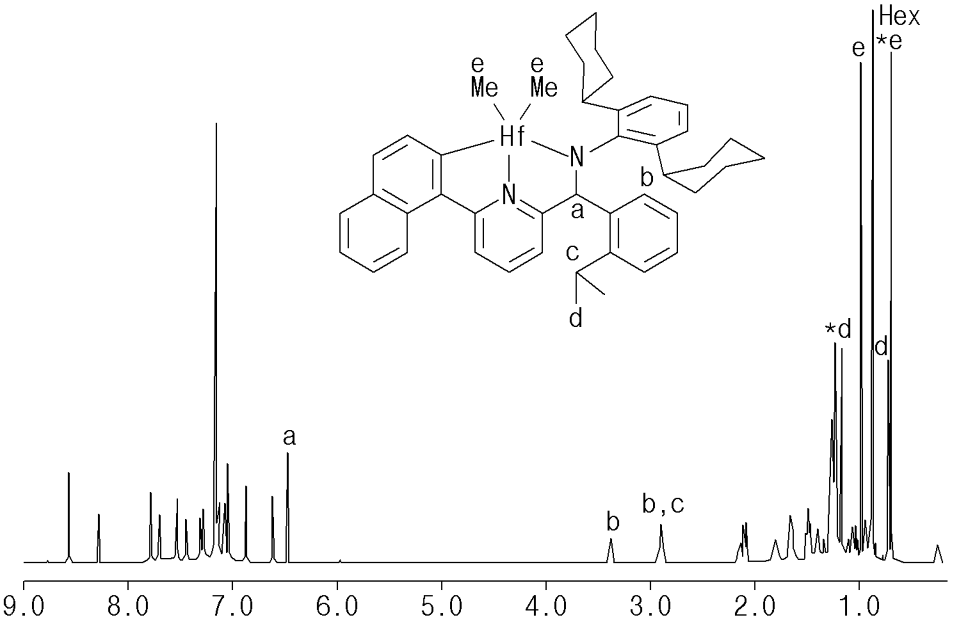
FIG. 1A shows an $^1$H NMR spectrum of a transition metal compound prepared in an example.

Hereinafter, the present invention will be described in more detail to assist the understanding of the present invention.

It will be understood that words or terms used in the description and claims of the present invention shall not be interpreted as the meaning defined in commonly used dictionaries. It will be understood that the words or terms should be interpreted as having a meaning that is consistent with their meaning in the technical idea of the invention, based on the principle that an inventor may properly define the meaning of the words to best explain the invention.

Polyolefin-Polystyrene-Based Multiblock Copolymer

The polyolefin-polystyrene-based multiblock copolymer of the present invention is characterized in satisfying the following conditions of (a) to (c), measured from gel permeation chromatography (GPC), and the following conditions of (d) in $^{13}$C NMR (500 MHz, tetrachloroethane-d2, standard material TMS) spectrum:

(a) a weight average molecular weight is from 100,000 to 300,000 g/mol;

(b) molecular weight distribution is from 1.5 to 3.o;

(c) with respect to measured results of the gel permeation chromatography, a Gaussian function modelled from a graph with an x-axis of log Mw and a y-axis of dw/dlog Mw is represented by the following Mathematical Formula 1, and in the following Mathematical Formula 1, all constants satisfy $-0.01<A<0.03$, $4.8<B<5.2$, $0.8<C<1.2$, and $0.6<D<1.2$; and (d) a polyolefin block in the polyolefin-polystyrene-based multiblock copolymer comprises one or more branch points, a carbon atom at the branch point shows a peak of 36 to 40 ppm, and a terminal carbon atom of a branched chain from the branch point shows a peak of 13 to 15 ppm:

[Mathematical Formula 1]

$$\frac{dw}{d\log Mw} = A + \frac{C\exp\left(\frac{-4\ln(2)(\log Mw - B)^2}{D^2}\right)}{D\sqrt{\frac{\pi}{4\ln(2)}}}$$

In Mathematical Formula 1, Mw is a molecular weight of a weight fraction (w) of the polyolefin-polystyrene-based multiblock copolymer.

The polyolefin-polystyrene-based multiblock copolymer of the present invention is prepared using a specific transition metal compound having a novel structure as a catalyst, which will be explained later, and a weight average molecular weight which is an important factor determining the physical properties of a copolymer satisfies Mathematical Formula 1, thereby having a weight average molecular weight and a molecular weight distribution value with specific distribution, and accomplishing excellent tensile properties (for example, tensile strength, elongation, modulus, or the like).

In relation to conditions (a), the weight average molecular weight of the polyolefin-polystyrene-based multiblock copolymer may be 100,000 to 300,000 g/mol, particularly, 105,000 g/mol or more, and 300,000 g/mol or less, 250,000 g/mol or less.

In relation to conditions (b), the molecular weight distribution of the polyolefin-polystyrene-based multiblock copolymer may be 1.5 to 3.0, particularly, 1.5 to 2.5, or 1.5 to 2.3.

The weight average molecular weight and the number average molecular weight are polystyrene conversion molecular weights analyzed by gel permeation chromatography (GPC), and the molecular weight distribution is calculated from the ratio of (weight average molecular weight)/(number average molecular weight).

As explained later, Mathematical Formula 1 of conditions (c) shows Gaussian distribution, constants B to D included therein are used as constants expressing the weight average molecular weight and molecular weight distribution of a copolymer, and the copolymer of the present invention satisfies the numerical ranges of A to D and at the same time, satisfies the weight average molecular weight and molecular weight distribution value of conditions (a) and (b).

In relation to conditions (c), with respect to measured results of the gel permeation chromatography, if Mathematical Formula 1 is derived from a Gaussian function modeled from a graph with an x-axis of log Mw and a y-axis of dw/dlog Mw, all constant values included in Mathematical Formula 1 may satisfy $-0.01<A<0.03$, $4.8<B<5.2$, $0.8<C<1.2$, and $0.6<D<1.2$. Particularly, constant A may be greater than −0.01, greater than −0.0099, and less than 0.03, constant B may be greater than 4.8, greater than 4.85, and less than 5.2, less than 5.19, constant C may be greater than 0.8, greater than 0.85, and less than 1.2, less than 1.19, and constant D may be greater than 0.6, greater than 0.65, and less than 1.2, less than 1.19.

Mathematical Formula 1 represents a differential molecular weight distribution curve in which the horizontal axis is "log(Mw)" which is the logarithmic value of a molecular weight (Mw), which is obtained by measuring gel permeation chromatography based on polystyrene conversion, and the vertical axis is "dw/dlog (Mw)" which is the derivative of a concentration fraction (w) by the logarithmic value of a molecular weight (log(Mw)), and may be considered as showing the weight fraction of a polymer having a corresponding molecular weight according to the logarithmic value of the corresponding molecular weight.

That is, in the present invention, a Gaussian function modeled from a graph in which x-axis is log Mw, and y-axis is dw/dlog Mw is represented by Mathematical Formula 1, and in this case, the values of constants A to D are calculated and they are found out to be included in specific ranges, respectively.

In Mathematical Formula 1, constants A to D are constants representing a curve shown by Gaussian distribution and show the height of a distribution curve, the width of a maximum peak half value, a central position shown by the maximum peak, or the like. More particularly, constant A included in the Gaussian distribution represents a y intercept, and constant C represents the arithmetic meaning of a graph area. In addition, constants B and D represent the physical properties of a copolymer corresponding to the weight average molecular weight and molecular weight distribution.

In relation to conditions (d), a polyolefin block included in the polyolefin-polystyrene-based multiblock copolymer includes one or more branch points, and a carbon atom at the branch point may show a peak of 36 to 40 ppm, or a peak of 37 to 40 ppm, and the terminal carbon atom of a branched chain from the branch point may show a peak of 13 to 15 ppm, particularly, a peak of 13.5 to 15 ppm.

As described above, in the polyolefin-polystyrene-based multiblock copolymer of the present invention, the carbon atom of the branch point has a high peak, and the terminal carbon atom of the branched chain has a relatively low peak, and it means that the polyolefin block of the polyolefin-polystyrene-based multiblock copolymer absolutely includes a branched chain derived from a main chain, and the length of the branched chain is long to show excellent physical properties.

The polyolefin-polystyrene-based multiblock copolymer may be one or more selected from the group consisting of a polystyrene-poly(ethylene-co-propylene)-polystyrene block copolymer, a polystyrene-poly(ethylene-co-1-butene)-polystyrene block copolymer, a polystyrene-poly(ethylene-co-1-pentene)-polystyrene block copolymer, a polystyrene-poly(ethylene-co-1-hexene)-polystyrene block copolymer, a polystyrene-poly(ethylene-co-1-heptene)-polystyrene block copolymer and a polystyrene-poly(ethylene-co-1-octene)-polystyrene block copolymer.

Method for Preparing Polyolefin-Polystyrene-Based Multiblock Copolymer

The method for preparing the polyolefin-polystyrene-based multiblock copolymer of the present invention is characterized in including: (S1) polymerizing an olefin-based monomer using an organozinc compound as a chain transfer agent in the presence of a catalyst composition to form a polyolefin block, wherein the catalyst composition comprises a transition metal compound represented by Formula 1 below; and (S2) anionic polymerizing the polyolefin block and a styrene-based monomer in the presence of an alkyllithium compound containing silicon and a triamine compound to form a polystyrene block.

Step (S1)

Step (S1) is a step of polymerizing an olefin-based monomer using an organozinc compound as a chain transfer agent in the presence of a catalyst composition including a transition metal compound represented by Formula 1 below to form a polyolefin block.

[Formula 1]

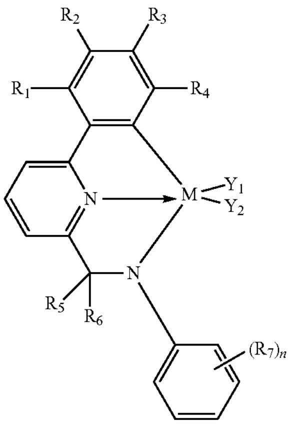

In Formula 1,

M is Ti, Zr or Hf, $R_1$ to $R_4$ are each independently hydrogen; a substituted or unsubstituted alkyl group of 1 to 20 carbon atoms; a substituted or unsubstituted cycloalkyl group of 3 to 20 carbon atoms; or a substituted or unsubstituted aryl group of 6 to 20 carbon atoms, where adjacent two or more among them may be connected to form a ring, $R_5$ and $R_6$ are each independently hydrogen; a substituted or unsubstituted alkyl group of 1 to 20 carbon atoms; a substituted or unsubstituted cycloalkyl group of 3 to 20 carbon atoms; or a substituted or unsubstituted aryl group of 6 to 20 carbon atoms, where the substituent is an alkyl group of 1 to 12 carbon atoms, each $R_7$ is independently a substituted or unsubstituted alkyl group of 4 to 20 carbon atoms; a substituted or unsubstituted cycloalkyl group of 4 to 20 carbon atoms; or a substituted or unsubstituted aryl group of 6 to 20 carbon atoms, n is 1 to 5, and $Y_1$ and $Y_2$ are each independently a halogen group; a substituted or unsubstituted alkyl group of 1 to 20 carbon atoms; an alkenyl group of 2 to 20 carbon atoms; an alkynyl group of 2 to 20 carbon atoms; a cycloalkyl group of 3 to 20 carbon atoms; an aryl group of 6 to 20 carbon atoms; an alkylaryl group of 7 to 20 carbon atoms; an arylalkyl group of 7 to 20 carbon atoms; a heteroaryl group of 5 to 20 carbon atoms; an alkoxy group of 1 to 20 carbon atoms; a substituted or unsubstituted aryloxy group of 5 to 20 carbon atoms; an alkylamino group of 1 to 20 carbon atoms; an arylamino group of 5 to 20 carbon atoms; an alkylthio group of 1 to 20 carbon atoms; an arylthio group of 5 to 20 carbon atoms; an alkylsilyl group of 1 to 20 carbon atoms; an arylsilyl group of 5 to 20 carbon atoms; a hydroxyl group; an amino group; a thio group; a silyl group; a cyano group; or a nitro group.

Particularly, in Formula 1, M may be Hf.

Particularly, in Formula 1, $R_1$ to $R_4$ may be each independently hydrogen; or a substituted or unsubstituted alkyl group of 1 to 20 carbon atoms, where adjacent two or more among them may be connected to form a ring. Alternatively, $R_1$ and $R_2$ may be each independently an alkyl group of 1 to 20 carbon atoms and may be connected with each other to form an aromatic ring of 5 to 20 carbon atoms, and $R_3$ and $R_4$ may be hydrogen.

Particularly, in Formula 1, $R_5$ and $R_6$ are each independently hydrogen; or a substituted or unsubstituted aryl group of 6 to 20 carbon atoms, where the substitution is with an alkyl group of 1 to 6 carbon atoms.

Particularly, in Formula 1, each $R_7$ may be independently a substituted or unsubstituted alkyl group of 4 to 20 carbon atoms; a substituted or unsubstituted cycloalkyl group of 4 to 20 carbon atoms; or a substituted or unsubstituted aryl group of 6 to 20 carbon atoms.

Particularly, in Formula 1, n may be 1 to 3, preferably, 2.

Particularly, in Formula 1, $X_1$ and $X_2$ may be each independently an alkyl group of 1 to 20 carbon atoms.

More particularly, the transition metal compound represented by Formula 1 may be a compound represented by Formula 1a below.

[Formula 1a]

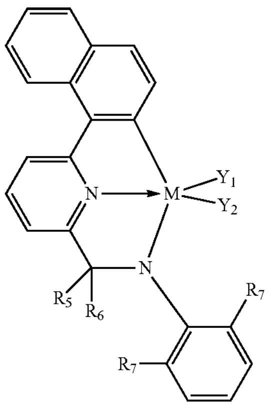

In Formula 1a,

M, $R_5$ to $R_7$, $Y_1$ and $Y_2$ are the same as defined above.

The transition metal compound represented by Formula 1 may be selected from the compounds below, but is not limited thereto, and all transition metal compounds corresponding to Formula 1 are included in the present invention.

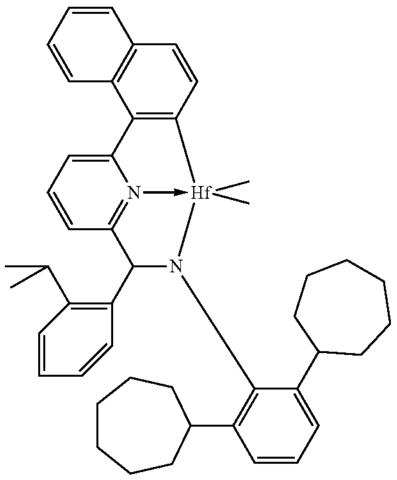

-continued

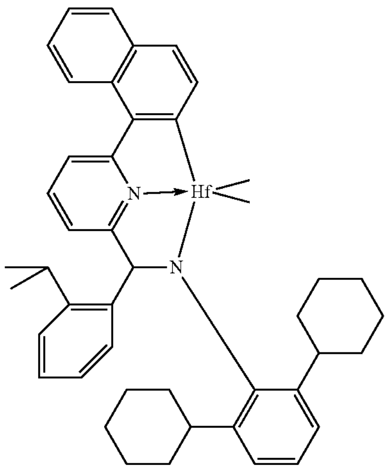

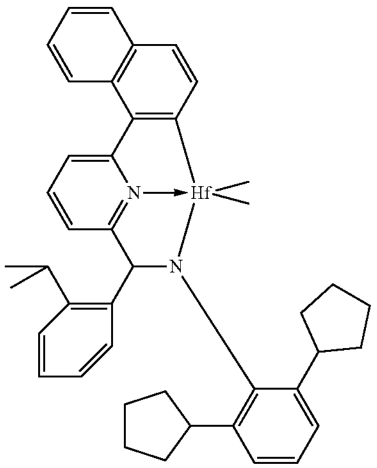

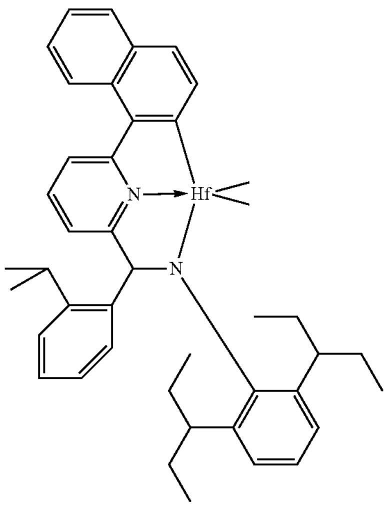

-continued

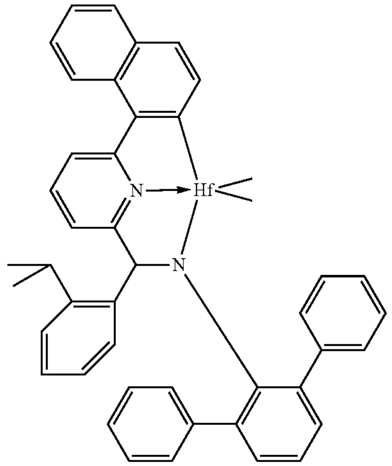

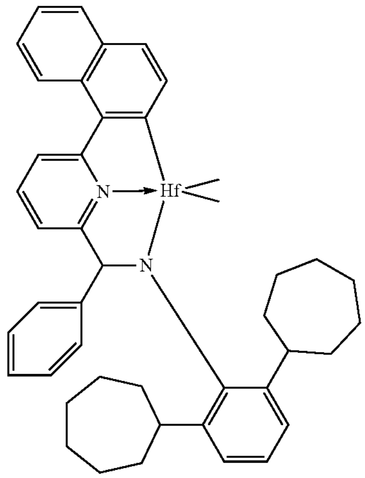

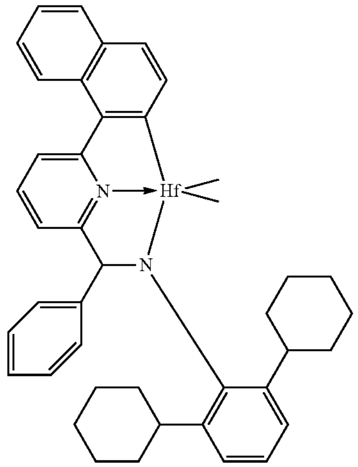

-continued

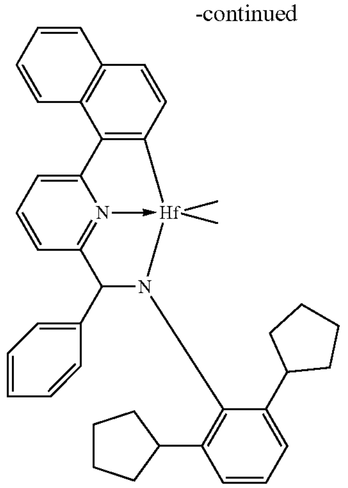

In addition, the present invention provides a ligand compound represented by Formula 2 below.

[Formula 2]

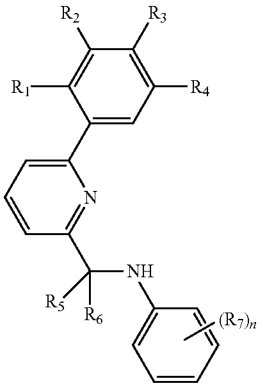

In Formula 2, $R_1$ to $R_4$ are each independently a substituted or unsubstituted alkyl group of 1 to 20 carbon atoms; a substituted or unsubstituted cycloalkyl group of 3 to 20 carbon atoms; or a substituted or unsubstituted aryl group of 6 to 20 carbon atoms, where adjacent two or more among them may be connected to form a ring, $R_5$ and $R_6$ are each independently hydrogen; a substituted or unsubstituted alkyl group of 1 to 20 carbon atoms; a substituted or unsubstituted cycloalkyl group of 3 to 20 carbon atoms; or a substituted or unsubstituted aryl group of 6 to 20 carbon atoms, where the substituent is an alkyl group of 1 to 12 carbon atoms, each $R_7$ is independently a substituted or unsubstituted alkyl group of 4 to 20 carbon atoms; a substituted or unsubstituted cycloalkyl group of 4 to 20 carbon atoms; or a substituted or unsubstituted aryl group of 6 to 20 carbon atoms, and n is 1 to 5.

That is, the transition metal compound of the present invention may be prepared by including a step of reacting a ligand compound represented by Formula 2 below and a compound represented by Formula 3.

[Formula 2]
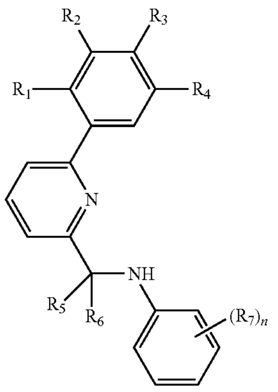
[Formula 3]
$M(Y_1Y_2)_2$
In the above formulae,
$R_1$ to $R_7$, M, $Y_1$ and $Y_2$ are the same as defined above.
Meanwhile, during preparing the transition metal compound represented by Formula 1 of the present invention, reactions may be performed by a process below.
[Reaction 1]
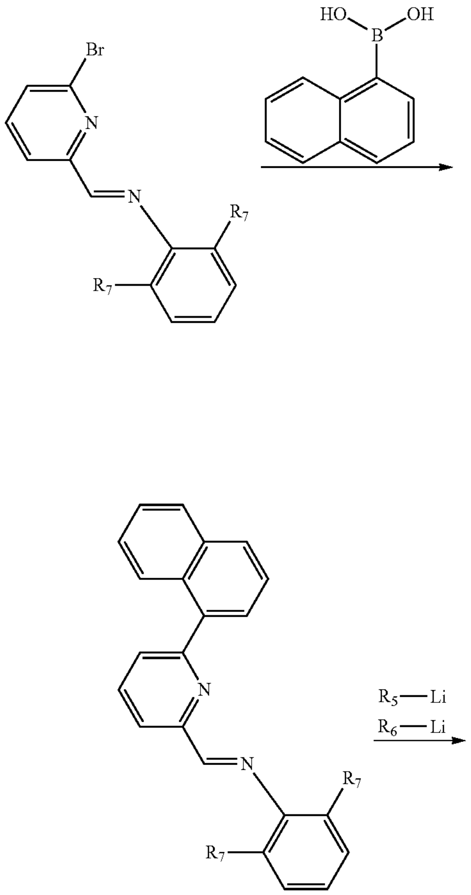
-continued
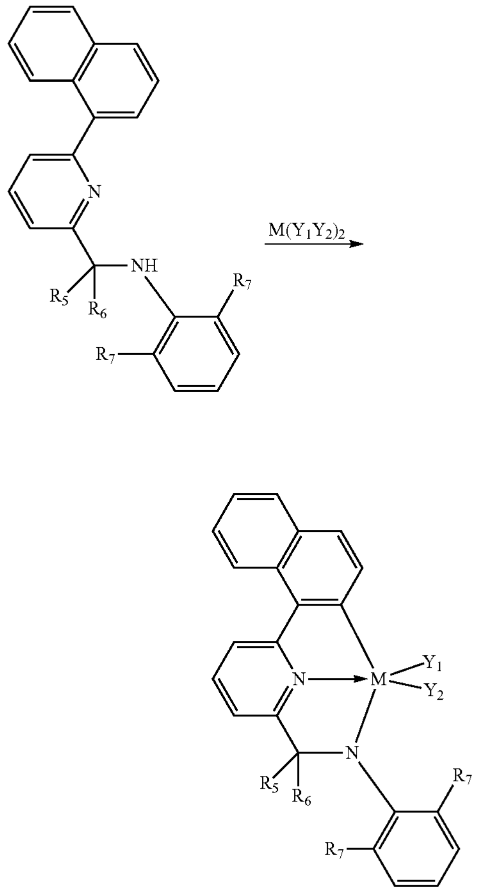
[Reaction 2]
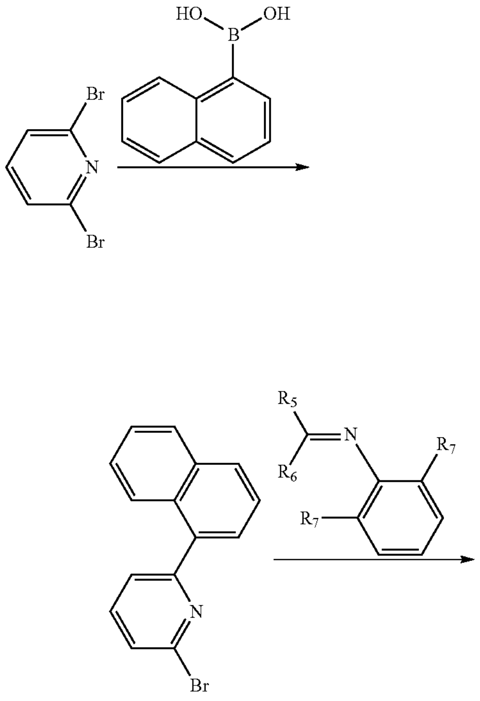

-continued

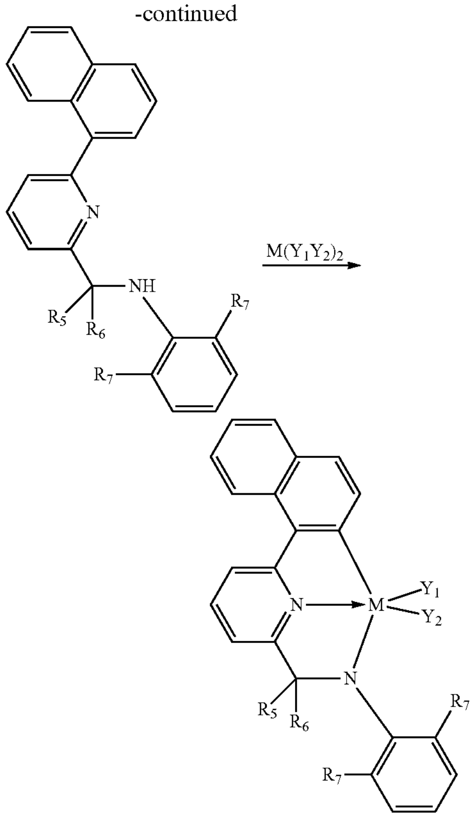

In the present invention, the organozinc compound is used as a chain transfer agent and is a material inducing the preparation of a copolymer by performing chain transfer during the preparation in polymerization reaction, particularly, may be a compound represented by Formula 4 below.

[Formula 4]

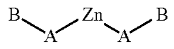

In Formula 4,

A is alkylene of 1 to 20 carbon atoms; arylene of 6 to 20 carbon atoms; or arylene of 6 to 20 carbon atoms, which is substituted with halogen, alkyl of 1 to 12 carbon atoms, cycloalkyl of 3 to 12 carbon atoms, alkoxy of 1 to 8 carbon atoms or aryl of 6 to 12 carbon atoms, and B is arylene of 6 to 12 carbon atoms, which is substituted with alkenyl of 2 to 12 carbon atoms.

In addition, A may be alkylene of 1 to 12 carbon atoms; arylene of 6 to 12 carbon atoms; or arylene of 6 to 12 carbon atoms, which is substituted with halogen, alkyl of 1 to 12 carbon atoms, cycloalkyl of 3 to 12 carbon atoms, alkoxy of 1 to 8 carbon atoms or aryl of 6 to 12 carbon atoms, and B may be arylene of 6 to 12 carbon atoms, which is substituted with alkenyl of 2 to 8 carbon atoms.

Formula 4 may have a structure in which both terminals of the formula have double bonds, for example, if B is arylene substituted with alkenyl, the arylene may be connected with A, and the double bond of the alkenyl substituted at the arylene may be positioned at the outermost part in Formula 4.

In the case where the organozinc compound is reacted with one or more types of olefin-based monomers in the presence of a catalyst composition, polymerization may be performed while the olefin-based monomers are inserted between zinc (Zn) and an organic group (A) of the organozinc compound.

The organozinc compound may be mixed in an amount of 1 to 200 equivalents based on 1 equivalent of the transition metal compound of Formula 1, and may particularly be mixed in an amount of 10 to 100 equivalents based on 1 equivalent of the transition metal compound of Formula 1.

The organozinc compound does not include THF and impurities such as a large amount of a magnesium salt and may be served with high purity, and accordingly, may be used as a chain transfer agent and is advantageously used in olefin polymerization.

In addition, the catalyst composition may further include a compound represented by Formula 5 below, and the compound represented by Formula 5 may play the roles of both a co-catalyst and a scavenger.

$$-[Al(R_a)-O]_m- \quad \text{[Formula 5]}$$

In Formula 5, each $R_a$ is independently a halogen radical; a hydrocarbyl radical of 1 to 20 carbon atoms; or a halogen-substituted hydrocarbyl radical of 1 to 20 carbon atoms, and m is an integer of 2 or more.

The compound represented by Formula 5 is not specifically limited as long as it is alkylaluminoxane. Preferred examples may be modified methylaluminoxane (MMAO), methylaluminoxane (MAO), ethylaluminoxane, isobutylaluminoxane, butylaluminoxane, etc., and particularly preferable compound may be modified methylaluminoxane (MMAO).

The compound represented by Formula 5 is a compound of an oligomer type produced by the reaction of alkylaluminum with water, and if used as a cocatalyst, chain transfer may be reduced. Accordingly, a copolymer having a high molecular weight may be prepared, and the generation of homo-polyolefin by side reactions may be prevented. Accordingly, finally, a polyolefin-polystyrene-based multiblock copolymer showing excellent physical properties such as high tensile strength may be prepared.

Meanwhile, the compound represented by Formula 5 may suppress chain transfer as described above, on the contrary, for example, a compound like alkylaluminum is used as a co-catalyst, chain transfer occurs a lot, the molecular weight of a copolymer may be reduced, the production of a homo-polyolefin may increase, and problems of degrading the physical properties of a block copolymer may be generated.

Like this, by using the transition metal compound represented by Formula 1 and the compound represented by Formula 5 in combination, the polyolefin-polystyrene-based multiblock copolymer having conditions (a) to (d) may be prepared.

In addition, the transition metal compound represented by Formula 1 and the compound represented by Formula 5 may be used in supported types by a support. As the support, silica or alumina may be used, without limitation.

In addition, the catalyst composition may further include a compound represented by Formula 6 below.

$$[L\text{-}H]^+[Z(A)_4]^- \text{ or } [L]^+[Z(A)_4]^- \quad \text{[Formula 6]}$$

In Formula 6,

Z is an element in group 13, each A is independently aryl of 6 to 20 carbon atoms where one or more hydrogen atoms may be substituted with substituents; or alkyl of 1 to 20 carbon atoms, and the substituent of A is halogen; hydrocarbyl of 1 to 20 carbon atoms; alkoxy of 1 to 20 carbon atoms; or aryloxy of 6 to 20 carbon atoms.

In step (S1), as the olefin monomer injected as a reaction material may use ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-icocene, or monomers formed by the mixtures thereof. The olefin monomer may use one type solely, or a mixture of two or more types.

For example, step (S1) may be performed in a homogenous solution state. In this case, a hydrocarbon solvent may be used as a solvent, or the olefin monomer itself may be used as a medium. The hydrocarbon solvent may include an aliphatic hydrocarbon solvent of 4 to 20 carbon atoms, particularly, isobutane, hexane, cyclohexane, methylcyclohexane, or the like. The solvent may be used alone, or mixtures of two or more thereof may be used.

The polymerization temperature of step (S1) may change according to the reaction material, reaction conditions, or the like, and may particularly be 70 to 170° C., particularly, 80 to 150° C., or 90 to 120° C. Within the aforementioned range, the solubility of a polymer may increase, and the catalyst may be thermally stabilized.

The polymerization in step (S1) may be performed by a batch type or a continuous type or may be performed by two or more steps having different reaction conditions.

The compound prepared by the above-described step (S1) may play the role of a precursor for preparing the polyolefin-polystyrene-based multiblock copolymer of the present invention by anionic polymerization reaction of step (S2), which will be explained later.

Step (S2)

Step (S2) is a step for preparing a polyolefin-polystyrene-based multiblock copolymer by the anionic polymerization of the polyolefin block and a styrene-based monomer in the presence of an alkyllithium compound including silicon and a triamine compound to form a polystyrene block.

In step (S2), the styrene-based monomers may be continuously inserted between the zinc-carbon bonds of (polyolefinyl)$_2$Zn included in the compound formed by step (S1), and at the same time, styrene groups present at the terminal of the compound formed by step (S1) may participate as copolymer moieties with the styrene-based monomers to be connected with a polystyrene chain. In addition, the multiblock copolymer produced through the process may be easily quenched through the reaction of terminal groups with water, oxygen or an organic acid, and through this, conversion into a polyolefin-polystyrene-based multiblock copolymer which is industrially useful may be achieved.

The styrene-based monomer may be a styrene-based monomer of 6 to 20 carbon atoms. More particularly, a styrene-based monomer including an ethylene substituted with an aryl group of 6 to 20 carbon atoms, an ethylene substituted with a phenyl group, or the like, for example, styrene may be used.

The alkyllithium compound including silicon may be a compound represented by Formula 7 below.

$(CH_3)_3Si(CH_2)Li$ [Formula 7]

Such an alkyllithium compound including silicon is a material widely used as the initiator of anionic polymerization and easily obtained, and is advantageously utilized in the present invention.

The triamine compound may be a compound represented by Formula 8 below.

[Formula 8]

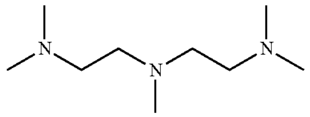

The triamine compound is a compound easily coordinated with lithium and used for the purpose of improving the reactivity as the base of the alkyllithium compound or the reactivity as a nucleophile, and easy to obtain, and has cheap unit price.

The present invention newly uses the compounds of Formulae 7 and 8 (for example, $Me_3SiCH_2Li$-(PMDETA)) as the initiators of step (S2), and may suppress the production amount of a polystyrene homopolymer, a polyolefin homopolymer, and a polyolefin-polystyrene diblock copolymer, while maximizing the production of the polyolefin-polystyrene-based multiblock copolymer which is an object of the present invention.

The alkyllithium compound including silicon represented by Formula 7 and the triamine compound represented by Formula 8 may be mixed in an aliphatic hydrocarbon solvent and then injected, or the alkyllithium compound including a silicon atom, represented by Formula 7 and the triamine compound represented by Formula 8 may be injected in order into a reactor.

The anionic polymerization temperature of step (S2) may be changed according to the reaction material, reaction conditions, or the like and may particularly be performed at 40 to 170° C., more particularly, 80 to 120° C.

The anionic polymerization of step (S2) may be performed by a batch type, a semi-continuous type or continuous type, or may be performed in two or more steps having different reaction conditions.

The anionic polymerization time of step (S2) may be changed according to the reaction material, reaction conditions, or the like, and may particularly be 0.5 to 10 hours, 0.5 to 8 hours, 0.5 to 5 hours, or 0.5 to 2 hours. Within the aforementioned range, the conversion of the total amount of the styrene-based monomer injected into the multiblock copolymer may be advantageous.

As described above, in the preparation method of the present invention, through a method of propagating a polyolefin chain through olefin polymerization using the above-described organozinc compound represented by Formula 4, and continuously performing styrene anionic polymerization, a polyolefin-polystyrene-based multiblock copolymer may be prepared, and through this, a polyolefin-polystyrene-based multiblock copolymer having improved physical properties than before and easily utilized in industry may be efficiently prepared.

EXAMPLES

Hereinafter, the present invention will be explained in more detail referring to embodiments. However, the embodiments are for illustrating the present invention, and the scope of the present invention is not limited thereto.

Reagents and Experimental Conditions

All experiments were performed under an inert atmosphere using a standard glove box and Schlenk technique. Toluene, hexane and tetrahydrofuran (THF) were distilled with benzophenone ketyl and used. Methylcyclohexane (anhydrous grade) used for polymerization reaction was purchased from Tokyo Chemical Industry (TCI), purified with a Na/K alloy, and used. $HfCl_4$ of sublimation grade was purchased from Streme and used as it was. An ethylene-propylene gas mixture was purified with trioctylaluminum (0.6 M in a mineral spirits) in a bomb reactor (2.0 L).

$^{1}H$ NMR (600 MHz) and $^{13}C$ NMR (150 MHz) spectrums were recorded using an ECZ 600 apparatus (JOEL).

Elemental analysis was conducted in Ajou University Analysis Center.

GPC data were analyzed in 1,2,4-trichlorobenzene at 160° C. using a PL-GPC 220 system equipped with a refractive index detector and two columns (Plarian Mixed-B 7.5x300 mm Varian [Polymer Lab]).

Preparation of Transition Metal Compound

[Formula 1-1]

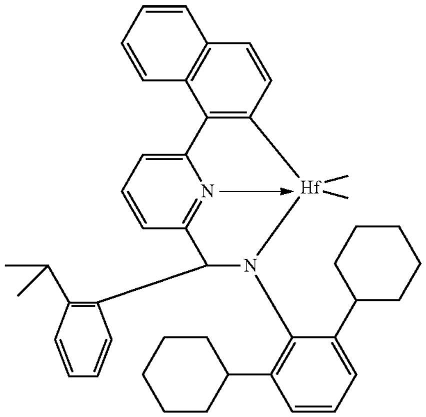

(i) Preparation of Ligand Compound

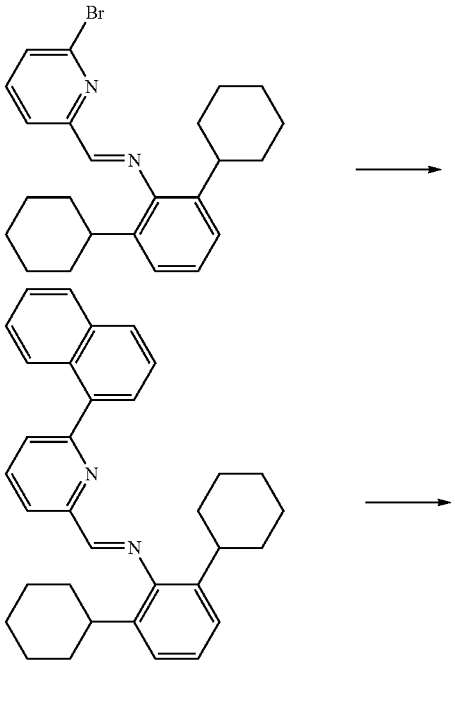

-continued

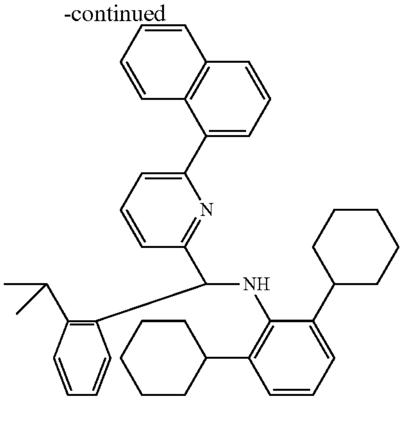

2,6-dicyclohexylaniline (0.772 g, 3.00 mmol) and 6-bromo-2-pyridinecarboxaldehyde (0.558 g, 3.00 mmol) were dissolved in toluene (5 mL), and molecular sieves were injected thereto. The mixture thus obtained was heated to 70° C. while stirring overnight. After filtering, the solvent was removed using a rotary evaporator. A yellow solid was obtained (1.07 g, 84%).

$^{1}H$ NMR ($C_6D_6$): δ 8.41 (s, 1H, NCH), 8.09 (d, J=7.8 Hz, 1H), 7.53 (m, 3H), 6.85 (d, J=7.8 Hz, 1H), 6.63 (t, J=7.8 Hz, 1H), 2.74 (m, 2H), 1.87 (d, J=12 Hz, 4H), 1.64 (d, J=12.6 Hz, 4H), 1.54 (d, J=10.8 Hz, 2H), 1.39 (quartet, J=10.2 Hz, 4H), 1.11 (m, 6H) ppm.

$^{13}C$ NMR ($C_6D_6$): δ 26.55, 27.33, 34.25, 39.30, 119.42, 124.32, 125.21, 129.83, 136.68, 138.82, 142.54, 148.94, 155.95, 162.06 ppm.

HRMS(EI): m/z calcd ([$M^+$] $C_{24}H_{29}BrN_2$) 424.1514. Found: 424.1516.

Under nitrogen, a schlenk flask was fill with the compound (1.07 g, 2.51 mmol), 1-naphthylboronic acid (0.453 g, 2.64 mmol), $Na_2CO_3$ (0.700 g, 6.60 mmol), and toluene (5 mL). Deaerated $H_2O$/EtOH (1 mL, v/v, 1:1) and a solution of $(Ph_3P)_4Pd$ (7.83 mg, 0.00678 mmol) in toluene (1 mL) were injected. By column chromatography on silica gel using hexane and ethyl acetate containing a small amount of triethylamine (v/v, 90:3:1), a lemon yellow oil was obtained (0.712 g, 60%).

$^{1}H$ NMR ($C_6D_6$): δ 8.70 (s, 1H, NCH), 8.41 (d, J=7.8 Hz, 1H), 8.31 (d, J=7.8 Hz, 1H), 7.68 (d, J=7.2 Hz, 1H), 7.65 (d, J=7.8 Hz, 1H), 7.54 (d, J=7.2 Hz, 1H), 7.27 (m, 4H), 7.20 (m, 4H), 2.93 (m, 2H), 1.90 (d, J=12 Hz, 4H), 1.61 (d, J=13.2 Hz, 4H), 1.50 (d, J=12.6 Hz, 2H), 1.38 (m, 4H), 1.11 (m, 6H), ppm.

$^{13}C$ NMR ($C_6D_6$): δ 26.63, 27.38, 34.35, 39.36, 119.21, 124.32, 124.98, 125.50, 126.15, 126.21, 126.64, 126.75, 128.15, 128.73, 129.38, 131.81, 134.52, 136.94, 137.14, 138.52, 149.48, 155.13, 159.79, 164.05 ppm.

HRMS(EI): m/z calcd ([$M^+$] $C_{34}H_{36}N_2$) 472.2878. Found: 472.2878.

2-isopropylphenyllithium (0.114 g, 0.904 mmol) dissolved in diethyl ether (8 mL) was added dropwisely to a schlenk flask containing the compound (0.247, 0.523 mmol) in diethyl ether (20 mL). After stirring for 3 hours, an aqueous solution (10 mL) of ammonium chloride (0.30 g) was added, and the product was extracted with diethyl ether (3x10 mL). The oil thus produced was dried at 60° C. overnight under high vacuum. A yellow solid was obtained (0.257 g, 83%).

$^{1}H$ NMR ($C_6D_6$): δ 8.24 (m, 1H), 7.90 (m, 1H), 7.64 (m, 1H), 7.62 (d, J=7.8 Hz, 1H), 7.56 (d, J=7.2 Hz, 1H), 7.26 (m, 3H), 7.22 (m, 4H), 7.11 (m, 5H), 5.62 (d, J=5.4 Hz, 1H,

NCH), 4.59 (d, J=5.4 Hz, 1H, NH), 3.31 (septet, J=7.2 Hz, 1H, CH), 2.74 (m, 2H), 1.79 (d, J=7.8 Hz, 2H), 1.64 (m, 4H), 1.54 (m, 4H), 1.32 (m, 4H), 1.08 (m, 2H), 1.03 (d, J=6.6 Hz, 3H, $CH_3$), 1.00 (m, 1H), 0.980 (d, J=6.6 Hz, 3H, $CH_3$), 0.921 (m, 3H) ppm.

$^{13}C$ NMR ($C_6D_6$): δ 23.78, 24.45, 26.63, 27.42, 27.54, 28.96, 34.77, 35.08, 39.01, 67.64, 119.99, 122.89, 124.13, 124.80, 125.36, 125.77, 126.08, 126.46, 126.56, 126.71, 127.58, 128.55, 129.35, 131.84, 134.64, 136.94, 138.77, 141.88, 142.24, 144.97, 146.32, 159.28, 163.74 ppm.

HRMS(EI): m/z calcd ($[M^+]$ $C_{43}H_{48}N_2$) 592.3817. Found: 592.3819.

(ii) Preparation of Transition Metal Compound

Figure 1B:
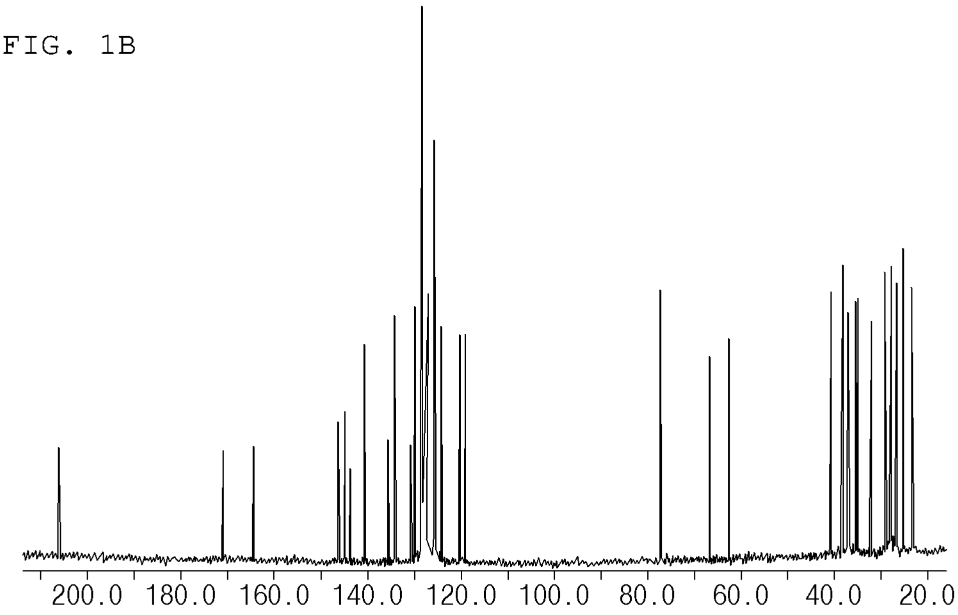
FIG. 1B shows a $^{13}$C NMR spectrum of a transition metal compound prepared in an example.

A schlenk flask was filled with the ligand compound (0.150 g, 0.253 mmol) in toluene (1.5 g), and n-BuLi (0.17 mL, a 1.6 M solution in hexane, 0.27 mmol) was added thereto dropwisely at room temperature. After stirring for 1 hour, $HfCl_4$ (0.814 g, 0.254 mmol) was added thereto as a solid. The reaction mixture was heated at 100° C. and stirred for 2 hours. After cooling, MeMgBr (0.29 mL, a 3.1 M solution in diethyl ether, 0.89 mmol) was injected and stirred at room temperature overnight. After removing volatile materials via a vacuum line, the product was extracted with toluene (1.5 g). The extract was filtered by celite filtering. The solvent was removed via a vacuum line, and the residue was softened in hexane (2 mL) to obtain a yellow solid (0.128 g, 63%). $^1H$ NMR spectrum and $^{13}C$ NMR spectrum were analyzed, and the results are shown in FIGS. 1A-1B.

$^1H$ NMR ($C_6D_6$): δ 8.58 (d, J=7.8 Hz, 1H), 8.29 (d, J=8.4 Hz, 1H), 7.79 (d, J=7.8 Hz, 1H), 7.71 (d, J=7.2 Hz, 1H), 7.54 (d, J=7.8 Hz, 1H), 7.46 (m, 1H), 7.30 (m, 2H), 7.15 (m, 3H), 7.09 (m, 3H), 6.88 (t, J=7.8 Hz, 1H), 6.62 (d, J=8.4 Hz, 1H), 6.48 (s, 1H, NCH), 3.39 (m, 1H), 2.92 (m, 2H), 2.15 (d, J=13.8 Hz, 1H), 2.10 (d, J=13.8 Hz, 2H), 1.80 (m, 2H), 1.65 (m, 3H), 1.29 (m, 6H), 1.17 (d, J=7.2 Hz, 3H, $CH_3$), 1.07 (m, 3H), 0.99 (s, 3H, $HfCH_3$), 0.95 (m, 2H), 0.73 (d, J=7.2 Hz, 3H, $CH_3$), 0.70 (s, 3H, $HfCH_3$), 0.23 (m, 1H) ppm.

$^{13}C$ NMR ($C_6D_6$): δ 23.31, 25.04, 26.63, 26.74, 27.70, 27.76, 27.81, 28.29, 28.89, 35.00, 35.66, 36.62, 37.02, 38.13, 40.88, 62.53, 67.00, 77.27, 119.30, 120.30, 124.29, 125.52, 125.60, 125.97, 126.95, 127.06, 127.73, 129.91, 130.00, 130.09, 130.85, 134.36, 135.80, 140.73, 140.89, 144.02, 145.12, 146.31, 146.38, 146.49, 164.46, 170.79, 206.40 ppm.

Anal. calcd. ($C_{45}H_{52}HfN_2$): C, 67.61; H, 6.56; N, 3.50%. Found: C, 67.98; H, 6.88; N, 3.19%.

Preparation of Organozinc Compound

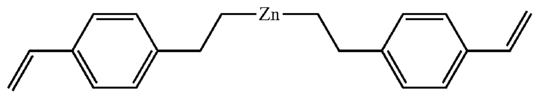

Borane dimethyl sulfide (1.6 mL, 3.2 mmol) was slowed injected into triethylborane (0.6 g) under stirring and reacted for 90 minutes. The resultant product was slowly injected to divinylbenzene (3.8 g) dissolved in anhydrous diethyl ether (10 mL) cooled to −20° C., followed by stirring overnight. After removing the solvents using a vacuum pump, diethylzinc (0.8 g) was added. The reaction was performed for 5 hours at 0° C. while removing triethylborane produced through distillation under a reduced pressure. An excess divinylbenzene and diethylzinc were removed by distillation under a reduced pressure at 40° C. Methylcyclohexane (150 mL) was added, and the resultant product was dissolved again. A solid compound produced as a by-product was filtered using celite to prepare an organozinc compound represented by the formula above.

Preparation of Polyolefin-Polystyrene-Based Multiblock Copolymer

Example 1

A parr reactor (600 mL) was dried in vacuum at 120° C. for 2 hours. A solution of MMAO (813 mg, 2020 μmol-Al) in methylcyclohexane (200 g) was injected into the reactor as a scavenger. The mixture thus obtained was stirred at 120° C. for 1 hour using a heating jacket, and a solution was removed using a cannula.

The reactor was filled with methylcyclohexane (1200 g) containing MMAO (2020 μmol-Al) as a scavenger, and 1-hexene (560 g) was charged as an olefin monomer, and then, the temperature was set to 90° C. The solution of organozinc compound (2800 μmol) in methylcyclohexane (1.58 g) was charged as a chain transfer agent, and a methylcyclohexane solution containing the transition metal compound (12 μmol-Hf) activated with $[(C_{18}H_{37})_2N(H)Me]^+[B(C_6F_5)_4]^-$(1.0 eq) in methylcyclohexane was injected. The valve of an ethylene tank was opened, and while maintaining the pressure in the reactor to 25 bar, polymerization was performed for 40 minutes in a range of 90-120° C. After polymerization, an ethylene gas was exhausted, and the temperature of the reactor was controlled again to 90° C.

If the temperature reached 90° C., a $Me_3SiCH_2Li$-(PMDETA) solution prepared by mixing $Me_3SiCH_2Li$ (3.080 mmol) and PMDETA (3.388 mmol) in methylcyclohexane (3.85 g) was added. After maintaining the temperature at 90° C. for 30 minutes while stirring, styrene (132 g) was injected. The temperature was controlled in a range of 90-100° C. using a heating jacket. The viscosity was gradually increased, and within 5 hours, an almost invisible state was attained. From the $^1H$ NMR analysis of an aliquot, complete conversion of styrene was confirmed. After the complete conversion of styrene, 2-ethylhexanoic acid and ethanol were continuously injected. The polymer lump thus obtained was dried overnight at 80° C. in a vacuum oven overnight.

Examples 2 to 15

The same method as in Example 1 was performed except for changing the reaction conditions as in Table 1 below.

Comparative Examples 1 to 4

As commercially obtained SEBSs, G1650, G1651, G1652, and G1654 of Kraton Co., were used, respectively.

Comparative Example 5

Preparation was performed by a method below using a compound represented by a formula below as the transition metal compound.

[Comparative Formula 1]

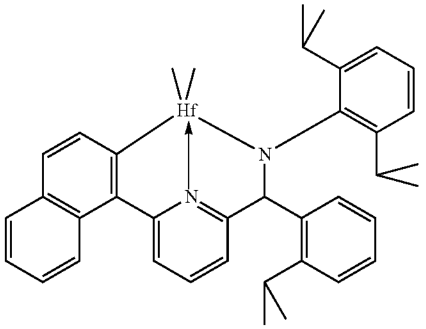

To a high-pressure reactor, a trimethylaluminum (14.4 mg, 200 μmol-Al) solution dissolved in methylcyclohexane (17 g) was injected. Catalyst poison in the high-pressure reactor was purified at 100° C. for 1 hour, and a solution was removed using a cannula.

The organozinc compound (49.1 mg, 150 μmol) was dissolved in methylcyclohexane (40 g) and injected into the high-pressure reactor, followed by raising the temperature to 80° C. A solution obtained by stirring the transition metal compound and $(C_{18}H_{37})N(Me)H^{+}[B(C_6F_5)_4]^{-}$ (4.0 μmol) in benzene for 2 hours was diluted in a solution (1.0 g) obtained by dissolving trioctylaluminum (50 μmol, 18.3 mg) in methylcyclohexane (15 g). A catalyst solution was injected into the high-pressure reactor followed by injecting a mixture gas of ethylene-propylene under a pressure of 20 bar. The temperature was controlled in a range of 95-115° C. The pressure was slowly reduced according to the consumption of a monomer, and after performing a polymerization process at 45° C. for 55 minutes, the remaining gas was exhausted.

$Me_3SiCH_2Li$ (150 μmol, 14.1 mg) and PMDETA (150 μmol, 26 mg) were mixed in methylcyclohexane (1.0 g) and then injected into the reactor and stirred for 30 minutes. The stirring temperature was maintained to 90° C. to 100° C. After injecting styrene (7.8 g) into the high-pressure reactor, the reaction was performed for 5 hours while maintaining the temperature to 90° C. to 100° C. so that all styrene monomers were converted. After the complete conversion of the styrene monomers, acetic acid and ethanol were continuously injected. After obtaining a polymer, drying was performed at 180° C. in a vacuum oven overnight.

Comparative Examples 6 to 9

Copolymers were prepared by the same method as in Comparative Example 5 except for changing the polymerization conditions as in Table 1 below.

TABLE 1

| | Catalyst | | Scavenger | | Organo zinc compound | alpha-olefin | | |
|---|---|---|---|---|---|---|---|---|
| | Type | Injection amount (μmol) | Type | (μmol) | (μmol) | Type | Injection amount | Styrene (g) |
| Example 1 | Formula 1-1 | 12 | MMAO | 2020 | 3100 | 1-hexene | 560 g | 101 |
| Example 2 | Formula 1-1 | 12 | MMAO | 2020 | 3100 | 1-hexene | 560 g | 104 |
| Example 3 | Formula 1-1 | 12 | MMAO | 2020 | 3100 | 1-hexene | 560 g | 104 |
| Example 4 | Formula 1-1 | 12 | MMAO | 2020 | 3040 | 1-hexene | 560 g | 104 |
| Example 5 | Formula 1-1 | 12 | MMAO | 2020 | 3100 | 1-hexene | 560 g | 104 |
| Example 6 | Formula 1-1 | 12 | MMAO | 1000 | 3100 | 1-hexene | 560 g | 104 |
| Example 7 | Formula 1-1 | 12 | MMAO | 1000 | 3100 | 1-hexene | 560 g | 143 |
| Example 8 | Formula 1-1 | 9 | MMAO | 1000 | 2600 | 1-hexene | 600 g | 104 |
| Example 9 | Formula 1-1 | 7 | MMAO | 1000 | 2600 | 1-hexene | 560 g | 86 |
| Example 10 | Formula 1-1 | 12 | MMAO | 1000 | 3100 | 1-hexene | 560 g | 98 |
| Example 11 | Formula 1-1 | 12 | MMAO | 1000 | 3100 | 1-hexene | 570 g | 104 |
| Example 12 | Formula 1-1 | 12 | MMAO | 1000 | 3100 | 1-hexene | 560 g | 104 |
| Example 13 | Formula 1-1 | 12 | MMAO | 1000 | 3100 | 1-hexene | 560 g | 104 |
| Example 14 | Formula 1-1 | 12 | MMAO | 1000 | 3100 | 1-hexene | 560 g | 104 |
| Example 15 | Formula 1-1 | 12 | MMAO | 1000 | 3100 | 1-hexene | 560 g | 104 |
| Comparative Example 1 | Commercial SEBS (G1650) | | | | | | | |
| Comparative Example 2 | Commercial SEBS (G1651) | | | | | | | |
| Comparative Example 3 | Commercial SEBS (G1652) | | | | | | | |
| Comparative Example 4 | Commercial SEBS (G1654) | | | | | | | |
| Comparative Example 5 | Comparative Formula 1 | 4 | TOA | 238 | 150 | 1-propylene | 20 bar | 7.8 |
| Comparative Example 6 | Comparative Formula 1 | 4 | TOA | 238 | 150 | 1-propylene | 20 bar | 7.8 |
| Comparative Example 7 | Comparative Formula 1 | 4 | TOA | 238 | 150 | 1-propylene | 20 bar | 7.8 |
| Comparative Example 8 | Formula 1-1 | 12 | TOA | 1000 | 3100 | 1-hexene | 560 | 104 |
| Comparative Example 9 | Formula 1-1 | 7 | TOA | 1000 | 2600 | 1-hexene | 560 | 86 |

Experimental Example 1

With respect to the polyolefin-polystyrene-based multiblock copolymers of the Examples and Comparative Examples, the physical properties below of the copolymers were measured.

(1) Measurement of the Contents of Ethylene, Alpha Olefin and Styrene

Measurement was performed through NMR. $^1$H NMR was measured under conditions of ns=16, d1=3s, solvent=TCE-d2, and 373K, using a Bruker 600 MHz AVANCE III HD NMR apparatus, and the solvent peak of TCE-d2 was calibrated to 6.0 ppm. $CH_3$ of 1-propylene was confirmed at 1 ppm, $CH_3$ related peaks (triplet) of a butyl branch by 1-hexene were confirmed at around 0.96 ppm, and the contents were calculated. In addition, the styrene content was calculated by aromatic peaks around 6.5 to 7.5 ppm.

(2) Weight Average Molecular Weight (Mw, g/Mol) and Molecular Weight Distribution (Polydispersity Index, PDI)

A weight average molecular weight (Mw, g/mol) and a number average molecular weight (Mn, g/mol) were measured, respectively, and molecular weight distribution (polydispersity index, PDI) was calculated by dividing the weight average molecular weight by the number average molecular weight.

Column: PL Olexis

Solvent: trichlorobenzene (TCB)

Flow rate: 1.0 ml/min

Specimen concentration: 1.0 mg/ml

Injection amount: 200 μl

Column temperature: 160° C.

Detector: Agilent High Temperature RI detector

Standard: Polystyrene

Mark-Houwink equation was used ($K=40.8\times10^{-5}$, $\alpha=0.7057$) to calculate the molecular weight by Universal Calibration.

(3) Calculation of the Values of Constants A-D of Mathematical Formula 1

In order to calculate the values of constants A-D, GPC measurement data were fitted by Gaussian function utilizing the Nonlinear curve Fit of Origin.

TABLE 2

| | Component (wt %) | | | GPC | | Constant | | | |
|---|---|---|---|---|---|---|---|---|---|
| | Ethylene | Alpha olefin | Styrene | Mw (g/mol) | PDI | A | B | C | D |
| Example 1 | 43.9 | 30.2 | 25.9 | 147,603 | 1.89 | −0.00195 | 5.01102 | 1.00645 | 0.80498 |
| Example 2 | 42.8 | 29.6 | 27.6 | 135,202 | 1.73 | 0.00464 | 5.0184 | 0.99127 | 0.75267 |
| Example 3 | 45.0 | 28.3 | 26.7 | 145,506 | 1.86 | 0.00338 | 5.01365 | 0.99393 | 0.77326 |
| Example 4 | 51.0 | 35.3 | 13.6 | 105,052 | 1.83 | 0.02283 | 4.89186 | 0.94295 | 0.71049 |
| Example 5 | 44.9 | 34.4 | 20.6 | 114,200 | 1.63 | 0.01763 | 4.93778 | 0.96346 | 0.67834 |
| Example 6 | 42.5 | 32.1 | 25.4 | 180,236 | 1.79 | −0.00914 | 5.087 | 1.0218 | 0.81827 |
| Example 7 | 38.8 | 31.8 | 29.4 | 180,193 | 1.73 | $-1.42 \times 10^{-4}$ | 5.09008 | 1.00157 | 0.77541 |
| Example 8 | 50.0 | 34.3 | 15.7 | 138,642 | 1.73 | 0.02698 | 4.9869 | 0.93256 | 0.66254 |
| Example 9 | 45.2 | 25.5 | 29.3 | 144,517 | 1.60 | 0.00555 | 5.02248 | 0.98928 | 0.69471 |
| Example 10 | 44.1 | 30.2 | 25.6 | 150,260 | 1.68 | $-1.08 \times 10^{-5}$ | 5.02479 | 1.00133 | 0.74595 |
| Example 11 | 37.9 | 22.3 | 39.8 | 105,326 | 1.59 | 0.00323 | 4.8854 | 0.99424 | 0.69299 |
| Example 12 | 43.9 | 26.4 | 29.7 | 148,499 | 1.76 | 0.01539 | 4.99401 | 0.96476 | 0.71786 |
| Example 13 | 43.3 | 31.5 | 25.1 | 157,001 | 1.85 | 0.01992 | 5.00695 | 0.95413 | 0.75787 |
| Example 14 | 43.3 | 31.1 | 25.6 | 144,188 | 1.67 | 0.00502 | 5.01307 | 0.98947 | 0.72544 |
| Example 15 | 44.5 | 29.4 | 26.1 | 140,830 | 1.71 | 0.01456 | 4.99103 | 0.96502 | 0.70273 |
| Comparative Example 1 | 44.3 | 26.2 | 29.5 | 54,600 | 1.10 | 0.03358 | 4.74824 | 0.93825 | 0.26181 |
| Comparative Example 2 | 43.4 | 24.8 | 31.8 | 139,300 | 1.10 | 0.02908 | 5.11902 | 0.95502 | 0.32777 |
| Comparative Example 3 | 44.6 | 26.6 | 28.8 | 44,100 | 1.10 | 0.04133 | 4.6115 | 0.93611 | 0.27114 |
| Comparative Example 4 | 43.3 | 25.5 | 31.2 | 95,600 | 1.10 | 0.04674 | 4.96706 | 0.92435 | 0.25721 |
| Comparative Example 5 | 32.4 | 33.6 | 34.0 | 110,886 | 1.76 | 0.02111 | 4.9278 | 0.94919 | 0.6935 |
| Comparative Example 6 | 39.4 | 18.6 | 42.0 | 101,006 | 1.71 | 0.01422 | 4.86284 | 0.97013 | 0.71894 |
| Comparative Example 7 | 39.9 | 22.1 | 38.0 | 93,075 | 1.73 | 0.01583 | 4.84804 | 0.96417 | 0.70169 |
| Comparative Example 8 | 44.1 | 24.2 | 31.7 | 72,049 | 1.44 | 0.0387 | 4.76182 | 0.94295 | 0.59101 |
| Comparative Example 9 | 45.2 | 21.3 | 33.5 | 69,464 | 1.56 | 0.0118 | 4.71197 | 0.97283 | 0.64955 |

Experimental Example 2

With respect to the polyolefin-polystyrene-based multiblock copolymers of the Examples and Comparative Examples, the peak values of the carbon atom at a branch point and the terminal carbon atom of a branched chain from the branch point are summarized and recorded in Table 3 below.

Particularly, a Bruker AVANCEIII 500 MHz NMR apparatus was used, about 50 mg of a specimen was put in 1.2 mL of TCE-d2 (tetrachloroethane-d2) solvent, followed by heating at 100° C. for 1 hour in a heating block and vortexing two or three times in the meantime. After checking the uniform dissolution, a sample was transferred to an NMR tube, and $^{13}C$ NMR spectrum was measured at 100° C.

TABLE 3

| | Carbon atom at branch point | Terminal carbon atom of branched chain |
|---|---|---|
| Example 1 | 38 | 14 |
| Example 2 | 38 | 14 |
| Example 3 | 38 | 14 |
| Example 4 | 38 | 14 |
| Example 5 | 38 | 14 |
| Example 6 | 38 | 14 |
| Example 7 | 38 | 14 |
| Example 8 | 38 | 14 |
| Example 9 | 38 | 14 |
| Example 10 | 38 | 14 |
| Example 11 | 38 | 14 |
| Example 12 | 38 | 14 |
| Example 13 | 38 | 14 |
| Example 14 | 38 | 14 |
| Example 15 | 38 | 14 |
| Comparative Example 1 | 34 | 11 |
| Comparative Example 2 | 34 | 11 |
| Comparative Example 3 | 34 | 11 |
| Comparative Example 4 | 34 | 11 |
| Comparative Example 5 | 30 | 23 |
| Comparative Example 6 | 30 | 23 |
| Comparative Example 7 | 30 | 23 |
| Comparative Example 8 | 38 | 14 |
| Comparative Example 9 | 38 | 14 |

Experimental Example 3

Each specimen was formed based on ASTM D412 tensile test method, and tensile strength, elongation and 300% modulus were measured.

TABLE 4

| | Tensile strength (MPa) | Elongation (%) | 300% modulus (MPa) |
|---|---|---|---|
| Example 1 | 18.6 | 1,695 | 2.1 |
| Example 2 | 19.7 | 1,802 | 2.0 |
| Example 3 | 21.9 | 1,772 | 2.3 |
| Example 4 | 16.2 | 2,510 | 1.2 |
| Example 5 | 14.6 | 2,822 | 1.0 |
| Example 6 | 24.1 | 1,959 | 1.9 |
| Example 7 | 18.6 | 1,901 | 1.4 |
| Example 8 | 16.7 | 1,931 | 1.4 |
| Example 9 | 27.3 | 1,361 | 4.1 |
| Example 10 | 24.4 | 1,757 | 2.7 |
| Example 11 | 25.9 | 1,191 | 7.1 |
| Example 12 | 26.8 | 1,524 | 4.2 |
| Example 13 | 19.4 | 2,128 | 1.6 |

TABLE 4-continued

| | Tensile strength (MPa) | Elongation (%) | 300% modulus (MPa) |
|---|---|---|---|
| Example 14 | 24.5 | 2,103 | 2.2 |
| Example 15 | 22.8 | 1,672 | 2.3 |
| Comparative Example 1 | 29.9 | 1,305 | 2.9 |
| Comparative Example 2 | 27.6 | 1,849 | 1.8 |
| Comparative Example 3 | 30.7 | 1,325 | 3.3 |
| Comparative Example 4 | 30.6 | 1,584 | 2.2 |
| Comparative Example 5 | 2.9 | 480 | 3.5 |
| Comparative Example 6 | 6.1 | 469 | 4.2 |
| Comparative Example 7 | 4.25 | 486 | 2.3 |
| Comparative Example 8 | 14.2 | 1,210 | 3.3 |
| Comparative Example 9 | 12.5 | 908 | 4.1 |

As shown in Table 4 above, it was confirmed that the block copolymers of Examples 1 to 15, satisfying all conditions (a) to (d), suggested in the present invention showed equally excellent tensile properties to certain levels including the tensile strength, elongation and 300% modulus when compared to the copolymers of the Comparative Examples, unsatisfying all the conditions.

Experimental Example 4

The complex viscosity was measured using an Advanced Rheometric Expansion System (ARES) of TA Instruments. The gap of a sample was set to 2.0 mm using parallel plates with a diameter of 25.0 mm at 160° C. Measurement was performed by a dynamic strain frequency sweep mode and 5% of strain at a frequency from 0.05 rad/s to 500 rad/s, 10 points were measured for each decade, and total 41 points were measured.

The complex viscosity at a frequency of 0.5 rad/s and 125 rad/s are summarized and recorded in Table 5 below.

TABLE 5

| | Complex viscosity | |
|---|---|---|
| | 0.5 rad/s | 125 rad/s |
| Example 3 | 319647 | 3463.83 |
| Example 6 | 311963 | 3378.05 |
| Example 10 | 351927 | 3745.63 |
| Example 14 | 336245 | 3580.51 |
| Comparative Example 1 | 830596 | 6538.66 |
| Comparative Example 3 | 196084 | 5001.26 |

As in the results, it was confirmed that the polyolefin-polystyrene-based multiblock copolymers according to the present invention showed low complex viscosity at a high frequency area, particularly, at a frequency of 125 rad/s, and excellent processability.

The invention claimed is:

1. A polyolefin-polystyrene-based multiblock copolymer satisfying the following conditions (a) to (c), measured by gel permeation chromatography (GPC), and the following condition (d) obtained from a $^{13}C$ NMR spectrum measured at 500 MHz using tetrachloroethane-d2 as a solvent and tetramethylsilane (TMS) as a standard material:

(a) a weight average molecular weight is from 100,000 to 300,000 g/mol;

(b) molecular weight distribution is from 1.5 to 3.0;

(c) measured results of the gel permeation chromatography, a graph having an x-axis of log Mw and a y-axis of dw/dlog Mw, are fit to a Gaussian function represented by the following Mathematical Formula 1, where all constants satisfy −0.01<A<0.03, 4.8<B<5.2, 0.8<C<1.2, and 0.6<D<1.2; and (d) a polyolefin block in the polyolefin-polystyrene-based multiblock copolymer comprises one or more branch points, where a carbon atom at each of the one or more branch points is represented by a peak of 36 to 40 ppm, and a terminal carbon atom of a branched chain from each of the one or more branch points is represented by a peak of 13 to 15 ppm:

[Mathematical Formula 1]

$$\frac{dw}{d\log Mw} = A + \frac{C\exp\left(\frac{-4\ln(2)(\log Mw - B)^2}{D^2}\right)}{D\sqrt{\frac{\pi}{4\ln(2)}}}$$

wherein, in Mathematical Formula 1, Mw is a molecular weight corresponding to a weight fraction (w) of a polyolefin-polystyrene-based multiblock copolymer.

2. The polyolefin-polystyrene-based multiblock copolymer according to claim 1, wherein the polyolefin-polystyrene-based multiblock copolymer is one or more selected from the group consisting of a polystyrene-poly(ethylene-co-propylene)-polystyrene block copolymer, a polystyrene-poly(ethylene-co-1-butene)-polystyrene block copolymer, a polystyrene-poly(ethylene-co-1-pentene)-polystyrene block copolymer, a polystyrene-poly(ethylene-co-1-hexene)-polystyrene block copolymer, a polystyrene-poly(ethylene-co-1-heptene)-polystyrene block copolymer and a polystyrene-poly(ethylene-co-1-octene)-polystyrene block copolymer.

3. A method for preparing a polyolefin-polystyrene-based multiblock copolymer, the method comprising:

polymerizing an olefin-based monomer using an organozinc compound as a chain transfer agent in the presence of a catalyst composition to form a polyolefin block, wherein the catalyst composition comprises a transition metal compound represented by the following Formula 1 and a compound represented by Formula 5; and anionic polymerizing the polyolefin block and a styrene-based monomer in the presence of an alkyllithium compound containing a silicon atom and a triamine compound to form a polystyrene block:

[Formula 1]

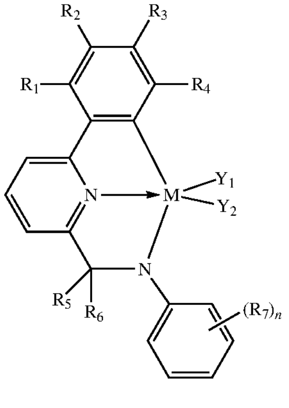

wherein, in Formula 1,

M is Ti, Zr or Hf, $R_1$ to $R_4$ are each independently hydrogen, a substituted or unsubstituted alkyl group of 1 to 20 carbon atoms, a substituted or unsubstituted cycloalkyl group of 3 to 20 carbon atoms, or a substituted or unsubstituted aryl group of 6 to 20 carbon atoms, where adjacent two or more among them may be connected to form a ring, $R_5$ and $R_6$ are each independently hydrogen, a substituted or unsubstituted alkyl group of 1 to 20 carbon atoms, a substituted or unsubstituted cycloalkyl group of 3 to 20 carbon atoms, or a substituted or unsubstituted aryl group of 6 to 20 carbon atoms, where the substituent is an alkyl group of 1 to 12 carbon atoms, each $R_7$ is independently a substituted or unsubstituted alkyl group of 4 to 20 carbon atoms, a substituted or unsubstituted cycloalkyl group of 4 to 20 carbon atoms, or a substituted or unsubstituted aryl group of 6 to 20 carbon atoms, n is 1 to 5, and $Y_1$ and $Y_2$ are each independently a halogen group, a substituted or unsubstituted alkyl group of 1 to 20 carbon atoms, an alkenyl group of 2 to 20 carbon atoms, an alkynyl group of 2 to 20 carbon atoms, a cycloalkyl group of 3 to 20 carbon atoms, an aryl group of 6 to 20 carbon atoms, an alkylaryl group of 7 to 20 carbon atoms, an arylalkyl group of 7 to 20 carbon atoms, a heteroaryl group of 5 to 20 carbon atoms, an alkoxy group of 1 to 20 carbon atoms, a substituted or unsubstituted aryloxy group of 5 to 20 carbon atoms, an alkylamino group of 1 to 20 carbon atoms, an arylamino group of 5 to 20 carbon atoms, an alkylthio group of 1 to 20 carbon atoms, an arylthio group of 5 to 20 carbon atoms, an alkylsilyl group of 1 to 20 carbon atoms, an arylsilyl group of 5 to 20 carbon atoms, a hydroxyl group, an amino group, a thio group, a silyl group, a cyano group, or a nitro group, $$—[Al(R_a)—O]_m— \quad \text{[Formula 5]}$$

in Formula 5, each $R_a$ is independently a halogen radical, a hydrocarbyl radical of 1 to 20 carbon atoms, or a halogen-substituted hydrocarbyl radical of 1 to 20 carbon atoms, and m is an integer of 2 or more.

4. The method for preparing a polyolefin-polystyrene-based multiblock copolymer according to claim 3, wherein the transition metal compound represented by Formula 1 is selected from the following compounds:

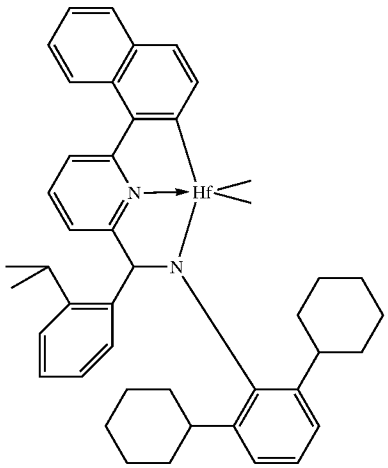

,

-continued
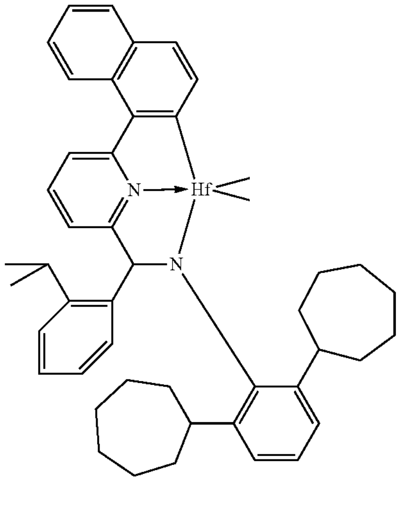
,
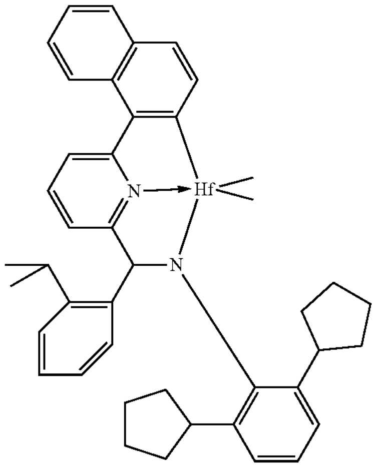
,
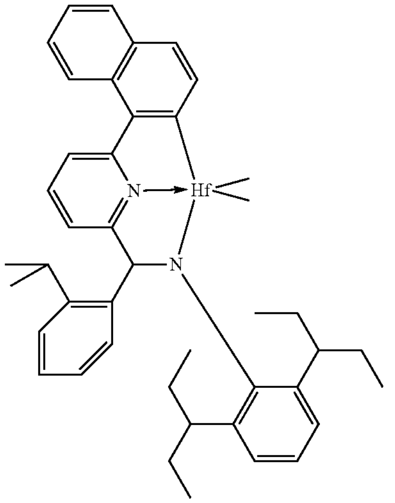
,
-continued
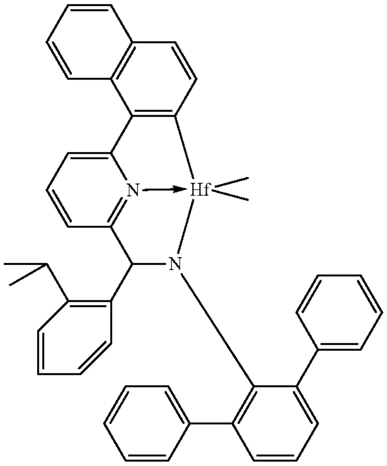
,
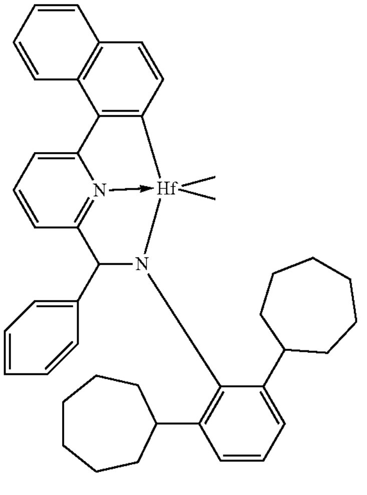
,
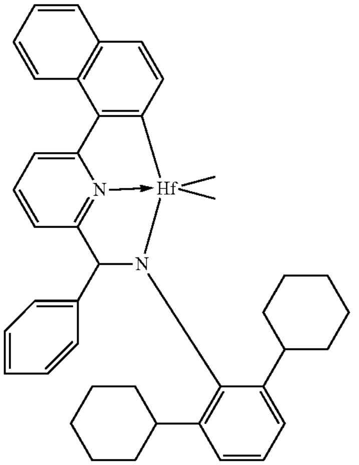
and -continued

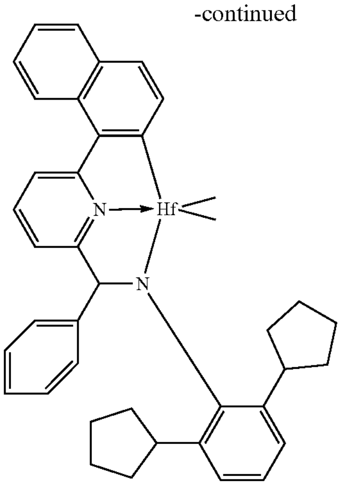

5. The method for preparing a polyolefin-polystyrene-based multiblock copolymer according to claim 3, wherein the organozinc compound is represented by the following Formula 4:

[Formula 4]

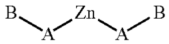

wherein, in Formula 4,

A is alkylene of 1 to 20 carbon atoms, arylene of 6 to 20 carbon atoms, or arylene of 6 to 20 carbon atoms, which is substituted with halogen, alkyl of 1 to 12 carbon atoms, cycloalkyl of 3 to 12 carbon atoms, alkoxy of 1 to 8 carbon atoms, or aryl of 6 to 12 carbon atoms, and B is arylene of 6 to 12 carbon atoms, which is substituted with alkenyl of 2 to 12 carbon atoms.

* * * * *